Patented Mar. 4, 1941

2,233,606

UNITED STATES PATENT OFFICE 2,233,606

PROCESS FOR THE CRYSTALLIZATION OF GLYCERIN

Henry B. Hass, West Lafayette, Ind., assignor to Purdue Research Foundation, La Fayette, Ind., a corporation of Indiana No Drawing. Application May 2, 1939, Serial No. 271,344

9 Claims. (Cl. 260—637)

My invention relates to the purification of glycerin, and more specifically to an improved process for purifying crude glycerin by crystallization.

In the past, glycerin has been obtained primarily by the saponification of fats, and has been purified by various chemical treatments of the crude solutions, followed by vacuum steam distillation. These methods of purification have not been entirely satisfactory for purifying saponification crudes or soap-lye crudes, and have been relatively unsatisfactory for the purification of glycerin from other sources, such as fermentation glycerin, or glycerin obtained by the hydrogenolysis of carbohydrates.

It has long been known that pure glycerin could be crystallized by special technics, involving super-cooling, followed by careful reheating or seeding with glycerin crystals. Such procedures, however, have not appeared adaptable to the purification of crude glycerin, due to the nature of the crystalline structure secured, and the difficulty of separating the mother liquor from the crystals.

I have now discovered, however, that crude glycerin from various sources may be satisfactorily purified by crystallization, if the crystallization is effected in a solution of the crude glycerin in another solvent. In accordance with this procedure, the glycerin crystals are obtainable in a suitable structure for easy separation from the motor liquor, and in a single crystallization, purified glycerin can be secured from various sources of crude glycerin with a degree of purity exceeding present standards for dynamite, C. P., or U. S. P. grades. By means of subsequent recrystallization, glycerin of extremely high purity is readily obtainable.

Any solvent which is at least partially miscible with liquid glycerin at the temperature of crystallization, which does not form solid solutions with glycerin crystals, and which under the conditions of crystallization is chemically inert to glycerin, may be employed in my process. Inorganic liquids, such as liquid ammonia, or any of the various organic solvents for glycerin can be utilized.

The solvents which I prefer to employ in my process have the following characteristics:

(1) Organic chemical constitution.
(2) Chemically inert to glycerin at the crystallization temperature.
(3) Freezing point below that of glycerin.
(4) Completely miscible with glycerin in the liquid phase at the crystallization temperature.
(5) Do not form solid solutions with glycerin crystals.
(6) Exhibit negative heat of solution when mixed with glycerin.
(7) Produce solutions of lower viscosity than pure glycerin at the crystallization temperature.

Among the suitable solvents for use in my process may be mentioned the following examples: Methanol, ethanol, 1-propanol, 2-propanol, 2-methyl-1-propanol, 1-butanol, 2-butanol, 1,2-ethanediol, 1,2-propanediol, 1,3-propanediol, 2,3-butanediol, 2,2'-dihydroxyethylether, 2-methoxyethanol, 2-ethoxyethanol, 2-butoxyethanol, 2-(2-ethoxyethoxy) ethanol, 2-(2-butoxyethoxy) ethanol, 2-aminoethanol, diethylamine, n-butylamine, isobutylamine, benzylamine, benzylmethylamine, benzylethylamine, aniline, pyridine, piperidine, alpha-picoline, and quinoline.

It should be understood, of course, that the characteristics designated above for the preferred solvents in my process, are desirable but not essential for the operation of the crystallization procedure. For example, a solvent having a melting point substantially above that of glycerin, but forming a eutectic mixture with a melting point considerably below that of glycerin, may be satisfactorily employed in suitable concentrations. Similarly, solvents may be employed which form two liquid phases with glycerin at the crystallization temperature, in which case crystallization may take place in either or both of the liquid phases, but will be most satisfactory with compositions which result in a single liquid phase after completion of the crystallization. Solvents exhibiting a relatively large negative heat of solution, when mixed with glycerin, are most satisfactory from the standpoint of securing high yields in a single crystallization, but solvents exhibiting no heat of solution, or even a positive heat of solution, will give equally high overall yields from a plurality of stages in the crystallization procedure. Similarly, solvents which give solutions of substantially lower viscosity than pure glycerin are desirable from the standpoint of enabling crystallization to proceed at a higher velocity, but solvents not possessing this property will nevertheless give satisfactory results with a somewhat longer crystallizing time, and will serve satisfactorily with respect to the formation of a suitable crystalline structure adapted to be easily separated from the mother liquor.

The temperature of crystallization may be any temperature below the freezing point of pure glycerin, and above the freezing point of the eutectic composition of glycerin and the particular solvent employed. Extremely low temperatures are undesirable from the standpoint of increased viscosity of the mother liquor, and from the standpoint of the cost of refrigeration. Relatively high temperatures, on the other hand, tend to decrease the yield of crystals in a single crystallization step. Economic considerations in any given case will therefore determine the optimum temperature. With most solvents I have found that temperatures from +10° C. to −30° C., and preferably from 0° C., to −20° C., are most satisfactory from the standpoint of crystallization velocity, yield of crystals, and ease of separation of crystals from the mother liquor.

The concentration of glycerin in the solvent employed should be such that at the crystallization temperature the partial vapor pressure of the dissolved glycerin exceeds the vapor pressure of crystalline glycerin. Any concentration above this minimum may be employed, the yield of crystals being greater with greater concentrations of glycerin. At too great concentrations of glycerin, however, the crystalline structure secured approaches that obtained without a solvent, and difficulty of separation of crystals from mother liquor may be encountered. Practical considerations therefore determine the optimum concentration in any given case, between these extreme limits. Concentrations of from 0.5 to 1.5 moles of glycerin per mole of solvent will usually be satisfactory if suitable temperatures are chosen.

In carrying out my process, the crude glycerin is dissolved in the solvent in the desired concentration, cooled to the crystallization temperature, and then seeded with a mass of previously-obtained glycerin crystals. The amount of seed employed is not critical, but may vary over a relatively wide range, without affecting the final result. A larger proportion of seed crystals will, of course, insure more rapid crystallization than a smaller quantity, and will in general produce a final crystalline mass having crystals of more uniform size. Economic considerations will therefore determine the optimum quantity of seed in any given case, depending upon the desired size and degree of uniformity of the final crystals. In general, I have found that from 2 to 6 per cent of relatively small seed crystals, based on the weight of the glycerin in the crude solution, will give satisfactory results.

After seeding, the solution is preferably agitated during the crystal growth. Here, again, the rate of agitation may vary over a relatively wide range without affecting the yield of crystals obtained. However, unduly slow agitation may result in the formation of crystal clumps or clusters, in which the individual crystals are seemingly cemented together, with the result that satisfactory separation from the mother liquor may become quite difficult. Unduly slow agitation likewise tends to prolong the time required for complete crystallization. Under such conditions there is relatively little breaking up of crystals to form new nuclei, which may take place to a pronounced extent with rapid agitation. Likewise, rapid agitation continuously replaces exhausted solution at the crystal surfaces with unexhausted solution, resulting in more rapid crystallization. Unduly rapid agitation, on the other hand, may result in breaking up the crystals to such an extent that the final crystalline structure comprises a very large number of very minute crystals, which are difficult to separate from the mother liquor by centrifuging, or other common methods. The optimum rate of agitation of course depends also upon the nature of the apparatus employed, but in any case a suitable rate may be determined by preliminary experiments, noting the size of the crystals produced, and insuring the formation of discrete crystals, rather than clumps or clusters.

My process, as described above, is applicable to the purification of crude glycerin from various sources, but it will of course be evident that the presence of excessive amounts of materials other than glycerin and the crystallizing solvent may seriously interfere with the process. In general, however, such a result will be avoided by the selective solvent action of the crystallizing solvent employed, and by the separation of any solids appearing in the solution on cooling to the crystallization temperature, before seeding. The presence of other materials in amounts larger than the minor concentrations of impurities commonly encountered in other crystallization purification methods will, of course, create an essentially ternary, or quaternary, or other multiple-component system, rather than an essentially binary system, with the result that eutectics other than the solvent-glycerin eutectic may be encountered, and must be taken into consideration when choosing the crystallization temperature. For example, when employing an organic crystallization solvent, the presence of considerable amounts of water in the crude glycerin will create a ternary mixture in which eutectics other than the glycerin-organic solvent eutectic may be encountered. My process therefore resembles other crystallization processes in being best adapted to the purification of crude material in which impurities, or solvents other than the crystallization solvent, are present in only relatively minor concentrations.

Ordinary saponification crudes or soap-lye crudes will be satisfactory for crystallization from organic solvents, if first evaporated to a glycerin concentration of approximately 95 per cent, followed by removal of any salts or other solids separating out on cooling to the crystallization temperature, before seeding. Similarly, vacuum-distilled crudes may be satisfactorily purified by my process, without the necessity of the usual chemical treatments prior to the vacuum distillation. Crude products obtained from the hydrogenolysis of carbohydrates may likewise be vacuum distilled to obtain glycerol fractions of relatively high concentrations, or fractions may be obtained containing primarily glycerol and a second product, such as propylene glycol, which latter may then serve as the crystallization solvent. In general, it may be stated that the usual considerations applicable to purification of organic compounds by crystallization, also apply to the present process, and that the usual precautions taken by those skilled in the art in such other crystallization processes should be employed in carrying out my invention.

My invention may be illustrated by the following specific examples:

*Example I*

The volatile portion of the product obtained by the hydrogenolysis of dextrose was subjected to vacuum distillation, without any prior chemical treatment, and a concentrated glycerin fraction was obtained which distilled over at 122–128° C. at a pressure of 3 mm. of mercury. The anhydrous crude glycerin thus obtained, which had a pronounced yellow color, was mixed with butanol in a proportion of approximately equal moles of glycerin and butanol, cooled to −2° C. to −4° C., and seeded with approximately 5 per cent of glycerin crystals, based on the weight of the glycerin in the solution. The vapor pressure of the dissolved glycerin at this temperature was approximately 5.4 x $10^{-6}$ mm. mercury, as compared to approximately 3.6 x $10^{-6}$ mm. mercury for crystalline glycerin at this temperature. The seeded solution was maintained at −3° C. for 2 hours, while agitating at 400 R. P. M. A large crop of small, white, uniform crystals was secured. These crystals were separated from the mother liquor by filtration, and washed with acetone. The crystals were then melted, and residual acetone was removed by vacuum distillation. The resulting liquid glycerin was a water-white product, which easily met the specifications for C. P. glycerin, or U. S. P. glycerin, and amounted to over 40 per cent of the glycerin in the original crude material.

*Example II*

A sample of crude glycerin, obtained as in Example I, was mixed with ethylene glycol in approximately equimolecular proportions, cooled to −18° to −20° C., and seeded with glycerin crystals, as in Example I. The vapor pressure of the dissolved glycerin, at this temperature, was approximately 2.8 x $10^{-7}$ mm. mercury, as compared with approximately 1.9 x $10^{-7}$ mm. mercury for crystalline glycerin at this temperature. The seeded mixture was maintained at −20° C. for approximately 2 hours, while agitating at 400 R. P. M., after which the resultant crystals were separated and washed with acetone. On melting the crystals and removing residual acetone by vacuum distillation, a water-white product was obtained, which easily met the specifications for C. P. or U. S. P. glycerin, and amounted to over 30% of the glycerin present in the original crude material.

It is to be understood, of course, that the above examples are illustrative only, and that various modifications of these procedures could be made in accordance with the foregoing description. In general, it may be stated that any modifications of procedure, and the use of any equivalents, which would naturally occur to those skilled in the art, are included within the scope of my invention.

My invention now having been described, what I claim is:

1. In a process for purifying impure glycerin, the steps which comprise incorporating glycerin crystals in a solution of said impure glycerin in a solvent medium which is chemically inert to glycerin and which does not form solid solutions with glycerin, said solvent medium comprising essentially a non-aqueous solvent for glycerin, at a temperature below the freezing point of pure glycerin and above the freezing point of the eutectic mixture of glycerin and said solvent, the concentration of glycerin in said solution being such that the partial vapor pressure of the dissolved glycerin exceeds the vapor pressure of crystalline glycerin at said temperature, permitting crystalline growth to take place at said temperature, and separating the resulting crystalline glycerin from the mother liquor.

2. In a process for purifying impure glycerin, the steps which comprise incorporating glycerin crystals in a solution of said impure glycerin in a solvent medium comprising essentially an organic solvent for glycerin which is chemically inert to glycerin and which does not form solid solutions with glycerin, at a temperature below the freezing point of pure glycerin and above the freezing point of the eutectic mixture of said organic solvent and glycerin, the concentration of glycerin in said solution being such that the partial vapor pressure of the dissolved glycerin exceeds the vapor pressure of crystalline glycerin at said temperature, permitting crystalline growth to take place at said temperature, and separating the resulting crystalline glycerin from the mother liquor.

3. In a process for purifying impure glycerin, the steps which comprise incorporating glycerin crystals in a solution of said impure glycerin in an organic solvent, at a temperature below the freezing point of glycerin and above the freezing point of the eutectic composition of glycerin and said solvent, said solvent being miscible with liquid glycerin at said temperature, being chemically inert to glycerin at said temperature, incapable of forming solid solutions with glycerin, having a freezing point below the freezing point of glycerin, having a negative heat of solution when mixed with glycerin, and capable of forming glycerin solutions having viscosities lower than that of pure glycerin at said temperature, the concentration of glycerin in said solution being such that the partial vapor pressure of the dissolved glycerin exceeds the vapor pressure of crystalline glycerin at said temperature, permitting crystalline growth to take place at said temperature, and separating the resulting crystalline glycerin from the mother liquor.

4. In a process for purifying impure glycerin, the steps which comprise incorporating glycerin crystals in a solution of said impure glycerin in an aliphatic alcohol, at a temperature below the freezing point of glycerin and above the freezing point of the eutectic composition of glycerin and said alcohol, the concentration of glycerin in said solution being 0.5–1.5 moles of glycerin per mole of solvent, and the temperature and concentration being such that the partial vapor pressure of the dissolved glycerin exceeds the vapor pressure of crystalline glycerin at said temperature, permitting crystalline growth to take place at said temperature, and separating the resulting crystalline glycerin from the mother liquor.

5. In a process for purifying impure glycerin, the steps which comprise incorporating glycerin crystals in an approximately 50% molar solution of said impure glycerin in an aliphatic alcohol containing less than 5 carbon atoms, at a temperature of 0° C., to −20° C., permitting crystal growth to take place at said temperature, and separating the resulting crystalline glycerin from the mother liquor.

6. In a process for purifying impure glycerin, the steps which comprise incorporating glycerin crystals in an approximately 50% molar solution of said impure glycerin in butanol, at a temperature of −2° to −4° C., permitting crystal growth to take place while agitating the mixture at said temperature for approximately 2 hours, and separating the resulting crystalline glycerin from the mother liquor.

7. In a process for purifying impure glycerin, the steps which comprise incorporating glycerin crystals in a solution of said impure glycerin in a solvent medium which is chemically inert to glycerin, and which does not form solid solutions with glycerin, said solvent medium comprising essentially an organic solvent for glycerin, at a temperature below the freezing point of pure glycerin and above the freezing point of the eutectic mixture of glycerin and said solvent, the concentration of glycerin in said solution being 0.5–1.5 moles of glycerin per mole of said organic solvent, and the temperature and concentration being such that the partial vapor pressure of the dissolved glycerin exceeds the vapor pressure of crystalline glycerin at said temperature, permitting crystalline growth to take place at said temperature, and separating the resulting crystalline glycerin from the mother liquor.

8. In a process for purifying impure glycerin, the steps which comprise incorporating glycerin crystals in a solution of said impure glycerin in a non-aqueous solvent which is chemically inert to glycerin and which does not form solid solutions with glycerin, at a temperature below the freezing point of pure glycerin and above the freezing point of the eutectic mixture of glycerin and said solvent, the concentration of glycerin in said solution being such that the partial vapor pressure of the dissolved glycerin exceeds the vapor pressure of crystalline glycerin at said temperature, permitting crystalline growth to take place at said temperature, and separating the resulting crystalline glycerin from the mother liquor.

9. In a process for purifying impure glycerin, the steps which comprise incorporating glycerin crystals in a solution of said impure glycerin in a non-aqueous solvent which is chemically inert to glycerin, and which does not form solid solutions with glycerin, at a temperature below the freezing point of pure glycerin and above the freezing point of the eutectic mixture of glycerin and said solvent, the concentration of glycerin in said solution being 0.5–1.5 moles of glycerin per mole of solvent, and the temperature and concentration being such that the partial vapor pressure of the dissolved glycerin exceeds the vapor pressure of crystalline glycerin at said temperature, permitting crystalline growth to take place at said temperature, and separating the resulting crystalline glycerin from the mother liquor.

HENRY B. HASS.